March 13, 1973 SHIZUO NAKAGAMI 3,720,524
CONTAINER ASSEMBLY WITH FRANGIBLE MIXING MEANS
Filed Oct. 16, 1970

INVENTOR
Shizuo Nakagami
BY Wenderoth, Lind & Ponack
ATTORNEY

United States Patent Office 3,720,524
Patented Mar. 13, 1973

3,720,524
CONTAINER ASSEMBLY WITH FRANGIBLE
MIXING MEANS
Shizuo Nakagami, 7–26, 1-chome Shimomae,
Toda, Japan
Filed Oct. 16, 1970, Ser. No. 81,293
Int. Cl. B65b 29/10
U.S. Cl. 99—171 B          5 Claims

ABSTRACT OF THE DISCLOSURE

The present disclosure relates to a container assembly designed to allow impromptu preparation and serving of fresh salad dressing on the table. A lower container containing salad oil and an upper container containing a spice-vinegar mixture are integrally joined. A seal cutter assembly is provided in the inside of the opening portion of the oil container, while a seal is secured in the inside of the opening portion of the upper container. The mouth of the upper container is adapted to be rotated while being kept in a closely fit engagement in the mouth of the oil container. When the containers are rotated relative to each other, the seal in the upper container is readily cut away by the seal cutter fixed to the lower container, thus allowing intermixture of the materials in the containers.

BRIEF DESCRIPTION OF THE INVENTION

This invention relates to the construction of a capsule type dressing container assembly comprising an integral combination of a container containing salad oil and a container containing spice-vinegar mixture. When it is desired to serve dressing, a partition between said containers is broken away to allow inter-mixture of the contents in the containers. The container assembly is then shaken to sufficiently mix up the contents, whereby desired salad dressing is prepared impromptu.

OBJECTS OF THE INVENTION

In general, dressing, which is used as a seasoning for salads, is prepared by mixing salad oil, vinegar, spices and so forth at suitable proportions respectively. It is however very troublesome to blend such materials at correct proportions at home, and further, such dressing, once prepared, is usually subject to change in taste in about half a day and can not keep long.

The object of the present invention is to provide a container assembly which eliminates such inconveniences and which enables easy and impromptu preparation of fresh dressing whenever so desired.

DETAILED DESCRIPTION OF THE INVENTION

The above-said object and advantages of the present invention will be understood more apparently from the following detailed description and the drawings embodying the present invention.

Figure 1:
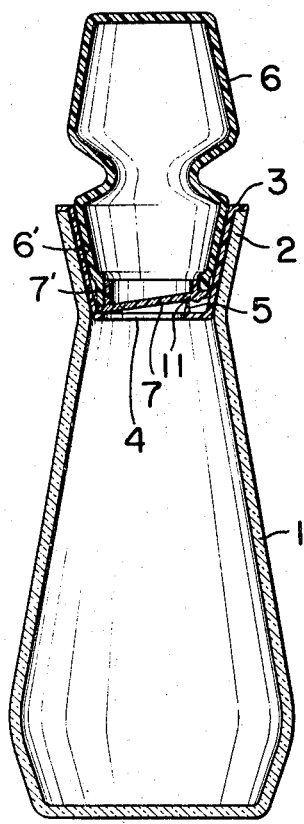
FIG. 1 is a front sectional view of the present container assembly in a state before use.

The salad oil container 1 has a sectional configuration such as shown in FIG. 1, and a seal cutter assembly 3 is fixedly provided in the inside of the cylindrical opening portion or mouth 2 of the container. In the center of the base of said seal cutter assembly 3 is formed a hole 4, and a cutting edge 5 is erected at an edge of said hole 4.

Said cutting edge 5 is sharpened at its top end and around its circumferential brim and is shaped like a knife.

The salad oil container 1 may be formed from the hollow molding of glass, porcelain or other oil-proof plastic material such as hard vinyl chloride. The seal cutter assembly 3 is preferably made from an injection molding of a plastic material which is oil-proof and has sufficient elasticity as well as suitable rigidity, such as for example medium or low pressure process polyethylene, polypropylene and the like. The spice-vinegar container 6 has a sectional configuration such as shown in FIG. 1, and a cylindrical portion 7' of the seal element 7 is secured in the inside of a lower part of the cylindrical mouth 6' of the container 6. Said mouth 6' of the container 6 is fitted in the inside of the seal cutter assembly 3 and is adapted to be rotatable horizontally within said cutter assembly while kept in such degree of tight fitness with said assembly 3 as will inhibit leakage of the fluid in the containers.

Figure 2:
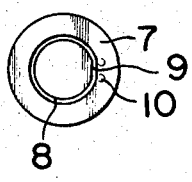
FIG. 2 is an enlarged perspective view of the seal element as taken from the bottom thereof.
Figure 4:
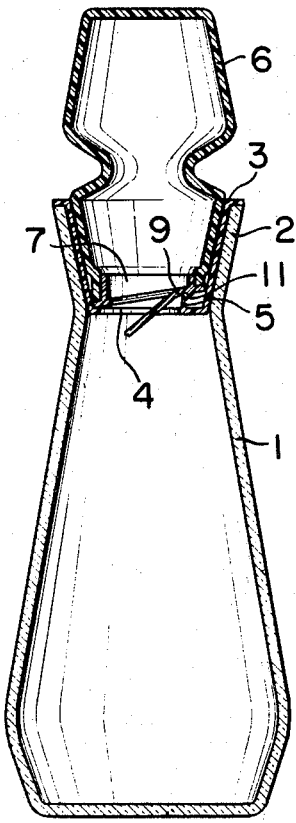
FIG. 4 is a front sectional view of the present container assembly in use.
Figure 3:
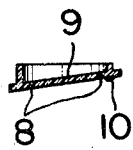
FIG. 3 is an enlarged front sectional view of said seal element.

The container 6 may be formed from the hollow molding of hard vinyl chloride, medium or low pressure process polyethylene or the like, and the seal 7 may be formed by the molding of soft high pressure process polyethylene or the like. As seen in FIGS. 1 to 3, said seal element 7 consists of a cylindrical wall 7' and a slant disc member. The slant of the seal element and height of the cutting edge 5 are so determined that when the highest point of the underside of the disc member is at the position aligned with the cutting edge 5, the seal element stays above the pointed end of the cutting edge 5, but when the container 6 is turned and the seal element 7 integral therewith is accordingly rotated, the cutting edge 5 hits the disc member and cuts it out. It is to be noted that the arc portion 8 in the disc member that is to be cut by the cutting edge 5, as well as the chord portion 9 connecting both ends of said arc portion 8, are thinned in wall thickness. The purpose of thinning the arc portion 8 is to facilitate the cutting of the seal element by the cutting edge 5, and the purpose of thinning the chord portion 9 is to facilitate the dangling of the cut portion of the seal element 7. The stoppers 10 serve as detents against unintentional rotation of the seal element 7 relative to the cutting edge 5 so as to prevent said seal element from being accidentally dislocated from its normal fixed position relative to the cutting edge and cutting said element when not so desired. That is, said stoppers 10 are so designed as to inhibit cutting of the seal element unless the container 6 is intentionally turned with enough force to cut out the stoppers with the cutting edge 5.

When using the device according to the present invention, salad oil is put into the container 1, while the container 6 is filled with a spice-vinegar mixture, and both containers are fitted together in the manner as shown in FIG. 1. When it is desired to serve dressing, the upper container 6 is turned relative to the lower container 1, whereby the seal element 7 is cut arcuately by the cutting edge 5 and the cut arc portion of the seal element 7 is forced to dangle down by the weight of the spice vinegar mixture in the upper container, and thus said mixture is mixed into salad oil in the lower container. Then, the container assembly is shaken to sufficiently mix up both materials, whereby desired salad dressing for one meal is prepared in the form ready for immediate serving on the table. Apparently, the upper container 6 can serve as a crown cap for the container 1 placed erect on the table. It should also be noted that an inwardly directed small projection 11 is formed at the top of the cutting edge 5. This small projection is so adapted that the cut arc portion of the seal element 7 will come below said projection, thereby to ensure the dangling of said arc portion.

Thus, according to the present invention, since salad oil and the spice-vinegar mixture are separately contained in the respective containers normally separated by a partition, there is no fear of causing any change in taste or quality even if they are preserved for a long time, and desired salad dressing can be prepared afresh instantly whenever so desired. Further, if the user buys and keeps on hand a salad oil container 1 for exclusive use as shaker, it may be repeatedly used for each preparation of salad dressing by buying capsules of the spice-vinegar mixture, and therefore the expense for packaging required will be only for the spice-vinegar containers, so that it is possible to always enjoy the taste of fresh salad dressing at low expense.

What I claim is:

1. A container assembly comprising:

a first container (1) adapted to contain a first fluid material and having a mouth opening (2) at one end thereof;

a seal cutter (3) attached to the mouth (2) of said first container (1), said seal cutter (3) having a side wall and a bottom wall, said bottom wall having a hole (4) therethrough and a cutting means (5) positioned adjacent said hole (4) and projecting towards the exterior of said first container (1); and a second container (6) adapted to contain a second fluid material and further adapted to be inserted into said seal cutter (3), said second container (6) having a sealing element (7) at one end (6') thereof, said sealing element (7) being faced towards said bottom wall and being inclined with respect thereto when said second container (6) is inserted into said seal cutter (3), said cutting means (5) lying below the surface of said sealing element (7) when said second container (6) and said seal cutter (3) are in a first relative rotational position, and a portion of said cutting means (5) lying above the surface of said sealing element (7) when said second container and said seal cutter (3) are in a second relative rotational position;

whereby when said second container (6) is inserted into said seal cutter (3) and is rotated relative thereto, said cutting means (5) cuts through said sealing element (7) along an arcuate line, thus permitting the contents of said second container (6) to flow into said first container (1).

2. A container assembly as claimed in claim 1 wherein said first container (1) contains salad oil and said second container (6) contains a spice-vinegar mixture.

3. A container assembly as claimed in claim 1 wherein said seal cutter (3) is fixedly attached to said mouth (2).

4. A container assembly as claimed in claim 1 wherein said seal cutter (3) is removably attached to said mouth (2).

5. A container assembly as claimed in claim 1 wherein said sealing element (7) carries stopper means (10) for maintaining said second container (6) and said seal cutter (3) in said first relative rotational position.

References Cited

UNITED STATES PATENTS

| 3,156,369 | 11/1964 | Bowes et al. | 215—6 |
| 3,415,360 | 12/1968 | Baumann et al. | 206—47 A |
| 2,653,609 | 9/1953 | Smith | 215—6 X |
| 2,642,870 | 6/1953 | Smith | 215—6 X |
| 3,344,914 | 10/1967 | Bloom et al. | 215—6 X |
| 3,347,410 | 10/1967 | Schwartzman | 206—47 A X |

FOREIGN PATENTS

| 1,932,783 | 2/1970 | Germany. |
| 611,863 | 10/1960 | Italy. |

TIM R. MILES, Primary Examiner

S. L. WEINSTEIN, Assistant Examiner

U.S. Cl. X.R.

99—171 CP, 171 C; 206—47 A; 215—6